United States Patent
Schalles

(10) Patent No.: US 12,480,825 B2
(45) Date of Patent: Nov. 25, 2025

(54) THERMOMETER HAVING A DIAGNOSTIC FUNCTION

(71) Applicant: Endress+Hauser Wetzer GmbH+Co. KG, Nesselwang (DE)

(72) Inventor: Marc Schalles, Erfurt (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 773 days.

(21) Appl. No.: 17/757,419

(22) PCT Filed: Dec. 1, 2020

(86) PCT No.: PCT/EP2020/084061
§ 371 (c)(1),
(2) Date: Jun. 15, 2022

(87) PCT Pub. No.: WO2021/121954
PCT Pub. Date: Jun. 24, 2021

(65) Prior Publication Data
US 2023/0042321 A1 Feb. 9, 2023

(30) Foreign Application Priority Data
Dec. 16, 2019 (DE) .......................... 102019134603.7

(51) Int. Cl.
G01K 15/00 (2006.01)
G01K 7/02 (2021.01)
G01K 7/42 (2006.01)

(52) U.S. Cl.
CPC ............. *G01K 15/005* (2013.01); *G01K 7/02* (2013.01); *G01K 7/42* (2013.01)

(58) Field of Classification Search
CPC ........... G01K 7/02; G01K 7/42; G01K 15/005
USPC ....................................... 374/1, 179
See application file for complete search history.

(56) References Cited

U.S. PATENT DOCUMENTS

| | | | |
|---|---|---|---|
| 2005/0104712 A1* | 5/2005 | Habboosh | G01K 1/10 374/E1.016 |
| 2024/0053209 A1* | 2/2024 | Schalles | G01K 7/02 |

FOREIGN PATENT DOCUMENTS

| | | |
|---|---|---|
| CN | 104458037 A | 3/2015 |
| CN | 107209064 A | 9/2017 |
| CN | 108369144 A | 8/2018 |
| DE | 202005021988 U1 | 2/2012 |
| DE | 102014119593 A1 | 6/2016 |
| DE | 102016123856 A1 | 6/2018 |
| DE | 102017120684 A1 | 3/2019 |
| DE | 102018116309 A1 | 1/2020 |
| EP | 0775897 A1 | 5/1997 |

(Continued)

*Primary Examiner* — Mirellys Jagan
(74) *Attorney, Agent, or Firm* — Christopher R. Powers; Endress+Hauser (USA) Holding, Inc.

(57) ABSTRACT

The present disclosure relates to a method for determining and/or monitoring the temperature of a medium by means of a thermometer having at least one temperature sensor, the method including: determining a measured value for the temperature of the medium by means of a temperature sensor; determining a heat flow, in particular heat dissipation, in the region of the temperature sensor; and determining a measured value deviation for the measured value for the temperature on the basis of a model for heat dissipation in the region of the temperature sensor.

13 Claims, 2 Drawing Sheets

(56) References Cited

FOREIGN PATENT DOCUMENTS

| WO | WO-2018103949 A1 | * | 6/2018 | ............. | G01K 11/00 |
| WO | WO-2020001874 A1 | * | 1/2020 | ......... | G01F 23/0007 |

* cited by examiner

THERMOMETER HAVING A DIAGNOSTIC FUNCTION

CROSS-REFERENCE TO RELATED APPLICATIONS

The present application is related to and claims the priority benefit of German Patent Application No. 10 2019 134 603.7 filed on Dec. 16, 2019, and International Patent Application No. PCT/EP2020/084061, filed Dec. 1, 2020, the entire contents of which are incorporated herein by reference.

TECHNICAL FIELD

The invention relates to state monitoring for a thermometer.

BACKGROUND

Thermometers are known from the prior art in a great variety of embodiments. Thus, there are thermometers which use the expansion of a liquid, a gas or a solid with a known coefficient of expansion in order to measure temperature, or also others which relate the electrical conductivity of a material, or a variable derived therefrom, to the temperature, such as electrical resistance when using resistance elements, or the thermoelectric effect in the case of thermocouples. On the other hand, radiation thermometers, in particular pyrometers, use the heat radiation of a substance to determine its temperature. The underlying measurement principles have each been described in a variety of publications.

In the case of a temperature sensor in the form of a resistance element, so-called thin-film and thick-film sensors and so-called thermistors (also referred to as NTC thermistors) have become known, among others. In the case of a thin-film sensor, in particular a resistance temperature detector (RTD), for example, a sensor element provided with connecting wires and mounted on a carrier substrate is used, wherein the back side of the carrier substrate usually has a metal coating. As sensor elements, so-called resistance elements, for example, in the form of platinum elements, are used, which among other things are also commercially available under the designations PT10, PT100, and PT1000.

In the case of temperature sensors in the form of thermocouples, however, the temperature is determined by a thermovoltage which arises between the unilaterally connected thermo wires made of different materials. Thermocouples according to the DIN standard IEC584, e.g., thermocouples of type K, J, N, S, R, B, T, or E, are usually used as temperature sensors for temperature measurement. However, other pairs of materials, in particular those with a measurable Seebeck effect, are also possible.

The task of thermometers in process automation is to determine the temperature of a medium, or of a process medium, reliably and as accurately as possible. In practice, there is the problem that the temperature sensor used in each case is separated from the medium by a plurality of thermal resistances. Such thermal resistances come about, for example, as a result of the individual components of the thermometer and possibly as a result of the container in which the medium is located, e.g., a reservoir or a pipeline. Frequently, the temperature sensor is part of a so-called measuring insert which comprises a casing element, which surrounds a filler and the temperature sensor embedded therein. In this case, serial thermal resistances result, for example, as a result of the casing and the filler.

If the thermometer also comprises, for example, a protective tube, further serial thermal resistances arise as a result of the protective tube itself, as well as the thermal coupling between the protective tube and the measuring insert. The choice of the length of the protective tube and of the measuring insert plays a decisive role in achieving a thermal balance between the process medium and the environment or the thermometer. If the protective tube and/or the measuring insert are/is too short, a temperature gradient may occur in the region of the temperature sensor. Such a temperature gradient depends on the one hand on the difference in the temperature of the medium or the process temperature, as the case may be, and the ambient temperature. On the other hand, however, the thermal conductivities of the respectively used components of the thermometer, the thermal couplings between the individual components and different process parameters, such as a flow rate of the process medium or the like, also play a decisive role.

A further cause of the occurrence of temperature gradients in the region of the temperature sensor is the formation of deposition layers and/or corrosion on the thermometer, e.g., on the protective tube or measuring insert, in particular in the region of the temperature sensor. The formation of deposits or the occurrence of corrosion leads to a change, in particular a deterioration, of the thermal coupling between the medium and the component of the thermometer respectively coming into contact with the medium, e.g., the protective tube or casing element.

The previous considerations also apply analogously in the event that the thermometer is a non-invasive thermometer which is applied to a wall of the container.

Irrespective of the embodiment of the thermometer, undesired temperature gradients occurring in the region of the temperature sensor can lead to considerable distortion of the measured values, regardless of the exact cause.

In order to avoid such distortion of measured values, it has become known, for example, to determine the true temperature value using three equidistant temperature sensors (Klaus Irrgang, Lothar Michalowsky: Temperaturmesspraxis [Temperature Measurement Practice], ISBN-13: 978380272204). However, this approach requires a comparatively complex construction and signal evaluation.

DE102014119593A1 discloses a thermometer that enables a temperature gradient to be detected along the connection lines. A resistance element in the so-called 4-conductor circuit is used as the temperature sensor. On one of the connecting wires, one piece of the connection line is replaced by another material, so that a differential thermocouple is formed from this and a further connection line. As soon as a temperature gradient occurs at the connecting wire consisting of two elements or two materials, a thermovoltage arises which gives information about the temperature gradient along the connecting wires. However, this temperature gradient only relates to the extension direction of the connecting wires. No direct statements can be made about any temperature gradients occurring directly in the region of the temperature sensor.

The previously unpublished patent application with file number 102018116309.6 discloses a thermometer which comprises a temperature sensor having a temperature-sensitive sensor element which is electrically contacted via at least a first and a second connection line. The first connection line is divided into a first section and a second section, wherein the first section, which faces the sensor element, consists of a first material, and wherein the second section, which faces away from the sensor element, consists of a second material which differs from the first material, while the second connection line likewise consists of the second material. The first section of the first connection line and at least a part of the second connection line then form a first differential temperature sensor in the form of a thermocouple, which is a heat flow sensor according to the thermoelectric principle. In this way, a temperature gradient or heat flow at the location of the temperature sensor can be detected. Reference is made to this application in its entirety below.

SUMMARY

Proceeding from the problem of undesirable temperature gradients in the region of the temperature sensor, the object of the present invention is to specify a thermometer with the highest measurement performance possible, in particular with high measurement accuracy.

This object is achieved by the method of the present disclosure. Advantageous embodiments are also disclosed.

The method according to the invention is a method for determining and/or monitoring the temperature of a medium by means of a thermometer having at least one temperature sensor, comprising the following method steps:
  determining a measured value for the temperature of the medium by means of the temperature sensor;
  determining a heat flow, in particular heat dissipation, or a variable connected to the heat flow, in the region of the temperature sensor; and
  determining a measured value deviation for the measured value for the temperature on the basis of a model for heat dissipation in the region of the temperature sensor.

The method according to the invention thus allows the measured values determined by means of the temperature sensor to be corrected, adjusted and/or compensated in each case with respect to undesired temperature gradients which can occur in the region of the temperature sensor. In this context, it is possible to output a compensated value in each case for the temperature of the medium. With respect to the compensation, the measured value deviation determined can be added with inverse signs to the measured value determined for the temperature. In order to determine the measured value deviation, a heat flow in the region of the temperature sensor or a variable related to this heat flow, for example a variable derived from the heat flow, or a variable representing the heat flow, for example a voltage, is determined and a measured value deviation for the measured values for the temperature is determined therefrom on the basis of a suitable model. The heat flow can be determined by means of a separate device or by means of the thermometer used for determining and/or monitoring the temperature.

In one embodiment of the method, a state indicator for the thermometer is determined on the basis of the measured value deviation determined. In this case, therefore, this is a method which likewise serves for monitoring the state of the device used for determining and/or monitoring the temperature. The state indicator is a statement about the state of the device, for example a defect in the region of the device.

In a further embodiment, the thermometer comprises a temperature sensor with a temperature-sensitive sensor element which is electrically contacted by means of at least a first connection line and a second connection line, wherein the first connection line is divided into a first section and a second section, wherein the first section, which faces the sensor element, consists of a first material, and wherein the second section, which faces away from the sensor element, consists of a second material which differs from the first material, wherein the second connection line consists of the second material, and wherein the first section of the first connection line and at least a part of the second connection line form a first differential temperature sensor in the form of a thermocouple. The method can therefore be carried out, for example, by means of a device as has been described in the previously mentioned German patent application with the file number 102018116309.6.

In this regard, it is advantageous if the heat flow is determined by means of the differential temperature sensor. In this regard, it is pointed out that, in the event that more than two connection lines are present, a corresponding device can also have a plurality of differential temperature sensors and that in this case one or more of the differential temperature sensors can be used to determine the heat flow.

In one embodiment of the method, the state indicator is determined by comparing the measured value deviation determined with a reference value for the measured value deviation. The reference value can refer, for example, to a value for the measured value deviation, which relates to structurally related temperature gradients in the region of the temperature sensor. A deviation of the measured value deviation from the limit value then allows a conclusion to be drawn about such gradients which arise over time during the operation of the thermometer in the process.

In this context, it is therefore advantageous if the reference value for the measured value deviation is determined using the process, in particular experimentally, preferably when the thermometer is put into operation in the process.

It is also advantageous if, in the event that a difference between the measured value deviation determined and the reference value exceeds or falls below a predefinable limit value, a statement about the state of the device is made. For example, a change in the process conditions and/or measurement conditions can be inferred.

In one embodiment of the method, in the case of invasive temperature determination and/or monitoring, the state indicator is a statement about an installation condition, the occurrence of corrosion, or a deposit formation and, in the case of non-invasive temperature determination and/or monitoring, the state indicator is a statement about a thermal coupling between the thermometer and a container containing the medium.

However, it is also conceivable for the state indicator to be a statement about a change or an exchange of the medium, a change in a flow rate of the medium, or, in the case of a known ambient temperature, a self-heating error in the region of the temperature sensor.

Additional information about the process or the process environment may be required for the respective statements about the state of the device. In this regard, it is useful, for example, to know about a temperature interval for the respective process, that is to say about expected changes in the process temperature, about the ambient temperature or another ambient parameter, about changes in the installation conditions of the thermometer, in particular the presence of thermal insulation, type and material of the container, about the, in particular, physical and/or chemical properties of the medium, the respective media type or changes to the respective medium, or also about changes in a flow rate of the medium.

For comprehensive state monitoring, it can also be advantageous for a plurality of differential temperature sensors to be present, by means of which spatially resolved determination of the heat flow in the region of the device is possible.

This can also help in particular to distinguish between a plurality of possible causes for an occurring temperature gradient.

In one embodiment, the model is a parametric model which, in particular, comprises at least one static and one dynamic term for determining the measured value deviation.

A further embodiment involves taking into account, by means of the model, in particular on the basis of at least one coefficient for the model, at least one installation condition or mounting condition of the thermometer on the container, a process condition of a process for which the thermometer is used, a parameter or another characteristic variable relating to the thermometer, a further process variable of the medium, in particular a flow rate, an ambient condition, in particular an ambient temperature or an environmental influence for the thermometer or information about the medium, in particular a physical and/or chemical property of the medium.

In yet another embodiment, at least one coefficient of the model is determined analytically or numerically. For example, appropriate formulas can be stored for the respective coefficients. To determine such coefficients can require the input of at least one measured value, which can also be determined by means of other measuring devices used for the respective process. However, values for the coefficients can also be determined by means of a regression or simulation.

In one embodiment, at least one coefficient is determined on the basis of a reference measurement by means of a reference device in a reference medium. In this case, in particular a deviation from the reference can be determined.

BRIEF DESCRIPTION OF THE DRAWINGS

The invention is explained in more detail based upon the following drawings. The following are shown:

FIG. 2.

In the figures, the same features are identified with the same reference signs.

DETAILED DESCRIPTION

Figure 1:
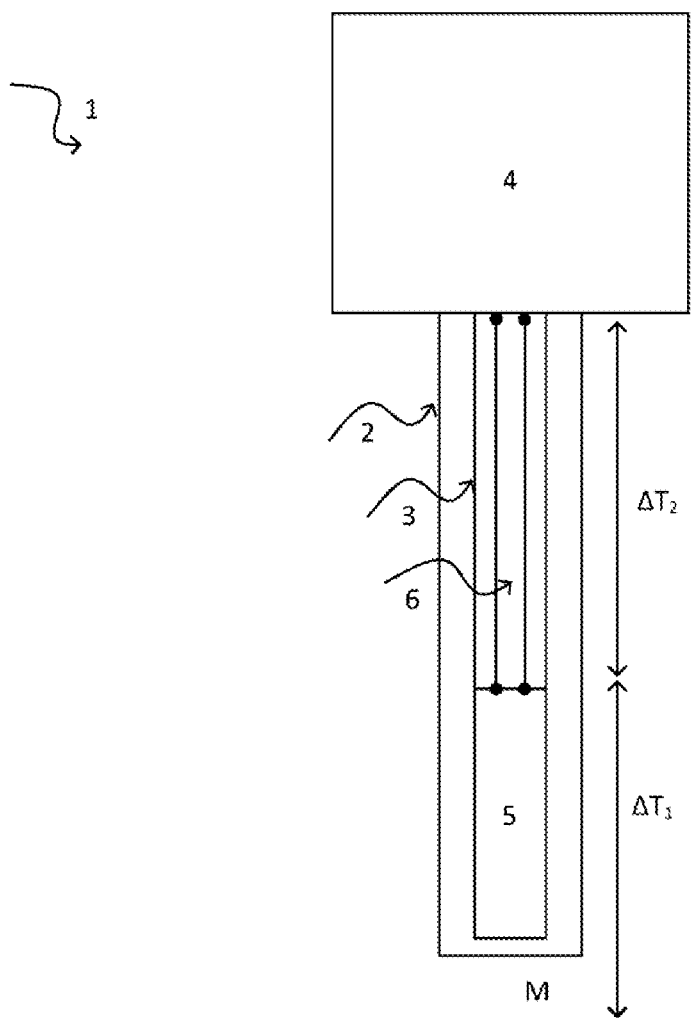
FIG. 1 shows a schematic representation of a thermometer according to the prior art with a temperature sensor in the form of a resistance element.

FIG. 1 shows a schematic representation of a thermometer 1 with a immersion body 2, e.g., a protective tube, a measuring insert 3, and an electronics module 4 according to the prior art. The measuring insert 3 is introduced into the immersion body 2 and comprises a temperature sensor 5 which in the present case comprises a temperature-sensitive element in the form of a resistance element. The temperature sensor is electrically contacted via the connection lines 6 and connected to the electronics module 4. In other embodiments, the electronics module 4 can also be arranged separately from the measuring insert 3 and immersion body 2. In addition, the sensor element 5 need not necessarily be a resistance element, nor does the number of connection lines 6 used need necessarily be two. Rather, the number of connection lines 6 can be selected appropriately depending on the measurement principle used and the temperature sensor used.

As already explained, the measuring accuracy of a thermometer 1 depends to a large extent on the respective materials and on contacting means, in particular thermal contacting means, in particular in the region of the temperature sensor 5. The temperature sensor 5 is in thermal contact with the medium M indirectly, i.e., via the immersion body 2. The temperature sensor 5 is thus separated from the medium M by a plurality of thermal resistances. Depending on the process conditions and/or the respective structural design of the thermometer, it is therefore possible that there is no thermal equilibrium between the medium M and the thermometer at least temporarily and/or in part. As a result of the absence of a thermal equilibrium, temperature gradients $\Delta T_1$ or $\Delta T_2$ may arise, for example, in the region of the temperature sensor 5 or also along the connection lines 6, said temperature gradients distorting the temperature values measured in each case with the temperature sensor 5 as a result of resulting heat flows.

Temperature gradients $\Delta T_1$ in the region of the temperature sensor 5 are particularly relevant in this context. The present invention therefore enables the detection of such temperature gradients. This leads to a significantly improved measuring accuracy of the thermometer.

The same considerations apply analogously to a thermometer for the non-invasive determination and/or monitoring of the temperature.

Figure 2A:
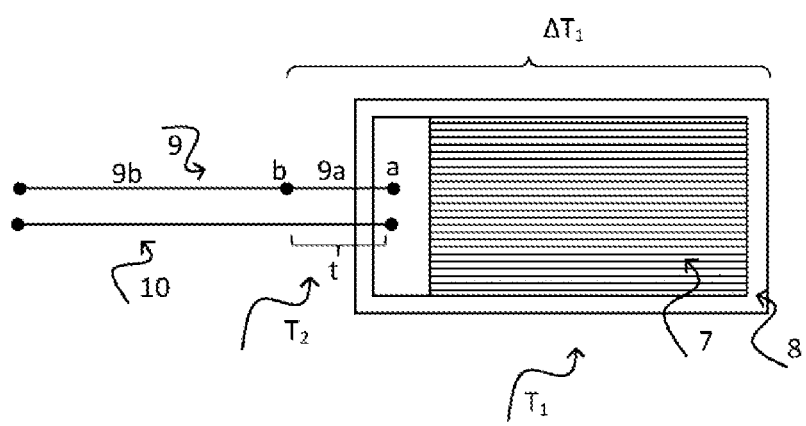
FIGS. 2a and 2b show exemplary embodiments of a thermometer with a differential temperature sensor for determining the heat flow.
Figure 2B:
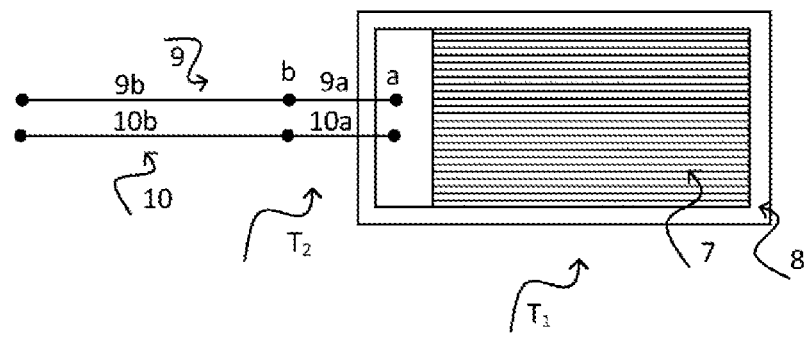

FIGS. 2a and 2b show possible exemplary embodiments of a thermometer having a differential temperature sensor T2 for determining the heat flow. A temperature sensor $T_1$ in the form of a resistance element 7 applied to a substrate 8 is used for determining and/or monitoring the temperature T of the medium M. The temperature sensor $T_1$ is electrically contacted by means of the two connection lines 9 and 10 and is thus operated in the so-called two-conductor circuit. In the present case, both connection lines 9 and 10 are attached directly to the resistance element 7. However, it should be noted at this point that all contacting means known to the person skilled in the art are possible in principle for connecting the temperature sensor $T_1$ to the connection lines 9 and 10.

The first connection line 9 is divided into a first section 9a and a second section 9b. The first section 9a consists of a first material, and the second section 9b and the second connection line 10 consist of a second material which differs from the first material. In this way, the first section 9a of the first connection line 9 and at least a part t of the second connection line 10 form a first differential temperature sensor $T_2$ in the form of a thermocouple. The two materials for the first section 9a of the first connection line 9 and the second section 9b of the first connection line and for the second connection line 10 are selected in such a way that a thermovoltage can be detected by means of $T_2$ due to a temperature difference between the points a and b and the different thermovoltages forming accordingly in the sections 9a and t due to the thermoelectric effect.

The first section 9a of the first connection line 9 is preferably short in comparison to the total length of the first connection line 9; for example, the length of the first section 9a of the first connection line 9 is in the range of a few millimeters or centimeters. In this way, it can be ensured that the values determined by means of the first differential temperature sensor $T_2$ reflect a temperature gradient $\Delta T_1$ in the region of the temperature sensor $T_1$ as far as possible.

In the example shown in FIG. 2a, the first connection line 9 and the second connection line 10 are separately attached to the resistance element. The first section 9a of the first connection line 9 and the part t of the second connection line 10 are thus indirectly connected via the resistance element 7. In another embodiment, however, the first section 9a of the first connection line 9 and the part t of the second connection line 10 could also be connected directly to one another and then attached to the temperature sensor $T_1$. Of course, instead of the temperature sensor $T_1$ shown by way of example here for all figures with a sensor element in the form of a resistance element 7, other temperature sensors well known to the person skilled in the art can also be used.

In the embodiment shown in FIG. 2b, the second connection line 10 is also divided into a first section 10a and a second section 10b. In this case, the first differential temperature sensor $T_2$ is formed by the first sections 9a and 10a of the first connection line 9 and the second connection line 10. According to FIG. 2b, but not necessarily, the two first sections 9a and 10a of the two connection lines 9 and 10 are of the same length. In this case, the second sections 9b and 10b of the first connection line 9 and of the second connection line 10 are extension wires, preferably similarly designed extension wires. However, in the case of the embodiment according to FIG. 2a, it is also advantageous if the second section 9b of the first connection line 9 and the second connection line 10 are of similar design.

By means of the method according to the invention, a heat flow W is now determined by means of the differential temperature sensor $T_2$ and a suitable model MOD for heat dissipation is provided by means of which a measured value deviation $\delta T$ can be determined on the basis of the temperature gradient $\Delta T$. By means of the measured value deviation $\delta T$, the measured values determined by the temperature sensor $T_1$ can be corrected and/or adjusted, i.e. measurement errors can be compensated and/or state monitoring of the thermometer 1 can be carried out.

One possibility for a corresponding model is given by a parametric model in which a compensated temperature $T_{ks}$ of the medium is composed of a plurality of terms, such as for example:

$$T_{ks} = T + k_1 + k_2 W + k_3 \frac{dT}{dW}$$

Here, $k_1$-$k_3$ are coefficients of the model MOD which can be determined, for example, numerically, analytically or experimentally. With the model MOD, static thermal and dynamic thermal measured value deviations can be achieved by means of a regression $\Sigma(T_{ks}-T_M)^2 \to 0$, where $T_M$ corresponds to the temperature of the medium M without the effect of a temperature gradient in the region of the temperature sensor.

An alternative for a suitable model MOD is, for example, one in which a variation of the measured value deviation $\delta T$ over time is taken into account, such as, for example:

$$T_{ks} = T + k_1 + k_2 W + k_3 \frac{dT}{dt}$$

It is pointed out that, in addition to the two exemplary models indicated here, numerous further models MOD can be formed, which also fall under the present invention. For example, instead of the heat flow, a different variable, in particular a measured variable, representing the heat flow, for example a voltage, can also be used for the model MOD.

The invention claimed is:

1. A method for determining and/or monitoring a temperature of a medium using a thermometer, wherein the thermometer comprises a temperature sensor including a temperature-sensitive sensor element electrically contacted to at least a first connection line and a second connection line,
wherein the first connection line includes a first section and a second section,
wherein the first section, which faces the sensor element, comprises a first material,
wherein the second section, which faces away from the sensor element, comprises a second material, which differs from the first material,
wherein the second connection line comprises the second material, and
wherein the first section of the first connection line and at least a portion of the second connection line define a first differential temperature sensor in the form of a thermocouple,
the method comprising:
determining a measured value of the temperature of the medium using the temperature sensor;
determining a heat flow, or a variable associated with the heat flow, in a region of the temperature sensor, wherein the heat flow is determined using the first differential temperature sensor; and
determining a measured value deviation for the measured value of the temperature based on a model for the heat flow in the region of the temperature sensor determined by the first differential temperature sensor.

2. The method of claim 1, wherein the heat flow is a heat dissipation.

3. The method of claim 1, wherein the model is a parametric model comprising at least one static and one dynamic term for determining the measured value deviation.

4. The method of claim 1, wherein at least one of the following is incorporated in the model via at least one coefficient of the model: an installation condition or mounting condition of the thermometer on a container containing the medium; a process condition of a process in which the thermometer is applied; a parameter or another characteristic variable relating to the thermometer; a process variable of the medium; a flow rate of the medium; an ambient temperature or an environmental influence for the thermometer; and information about a physical and/or chemical property of the medium.

5. The method of claim 1, wherein at least one coefficient of the model is determined using a reference measurement using a reference device in a reference medium.

6. The method of claim 1, wherein at least one coefficient of the model is determined analytically or numerically.

7. The method of claim 6, wherein a process variable of the medium other than the temperature is a flow rate of the medium.

8. The method of claim 1, wherein a state indicator for the thermometer is determined based on the determined measured value deviation.

9. The method of claim 8, wherein, in the case of invasive temperature determination and/or monitoring, the state indicator is a statement about an installation condition, an occurrence of corrosion, or a deposit formation and, in the case of non-invasive temperature determination and/or monitoring, the state indicator is a statement about a thermal coupling between the thermometer and a container containing the medium.

10. The method of claim 8, wherein the state indicator is a statement about a change of the medium or an exchange of the medium, about a change in a flow rate of the medium, or about a self-heating error in the region of the temperature sensor caused by a self-heating of the temperature sensor.

11. The method of claim 8, wherein the state indicator is determined by comparing the determined measured value deviation with a reference value for the measured value deviation.

12. The method of claim 11, wherein, when the thermometer is put into operation in a process, the reference value for the measured value deviation is determined experimentally using the process.

13. The method of claim 11, further comprising making a statement about the state of the thermometer when a difference between the determined measured value deviation and the reference value exceeds or falls below a predefined limit value.

* * * * *